May 24, 1938.   J. BOCK   2,118,722
VEHICLE OPERATED GATE AND LATCH
Filed March 25, 1937   2 Sheets-Sheet 1
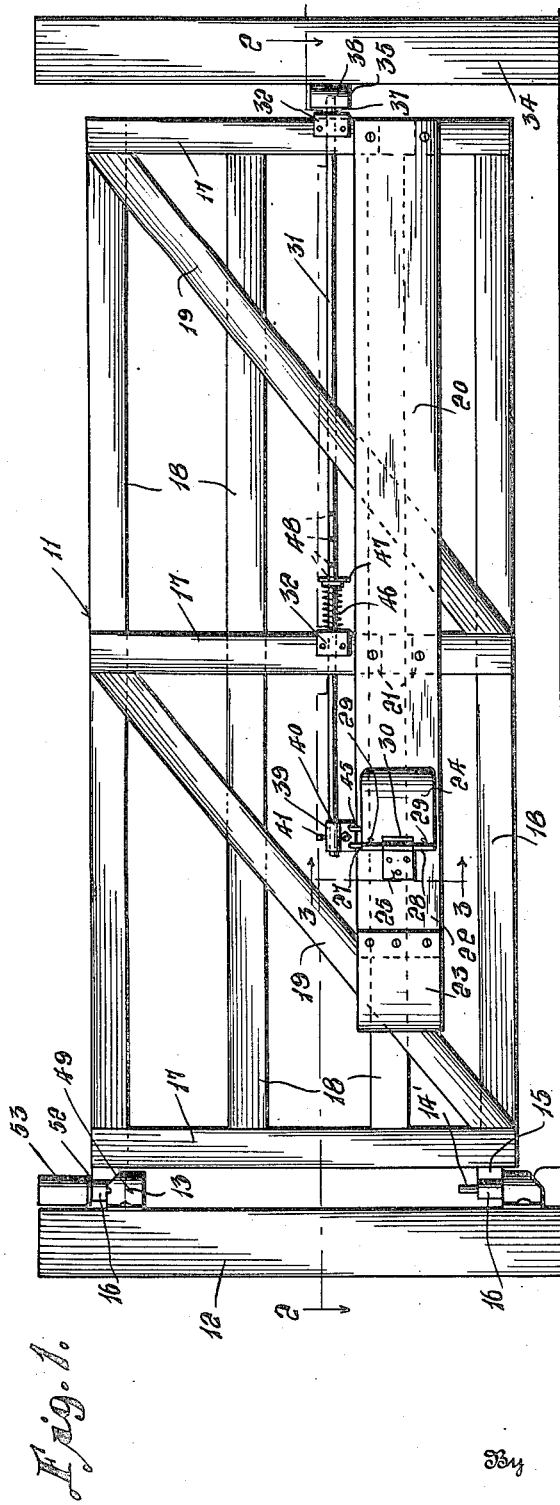
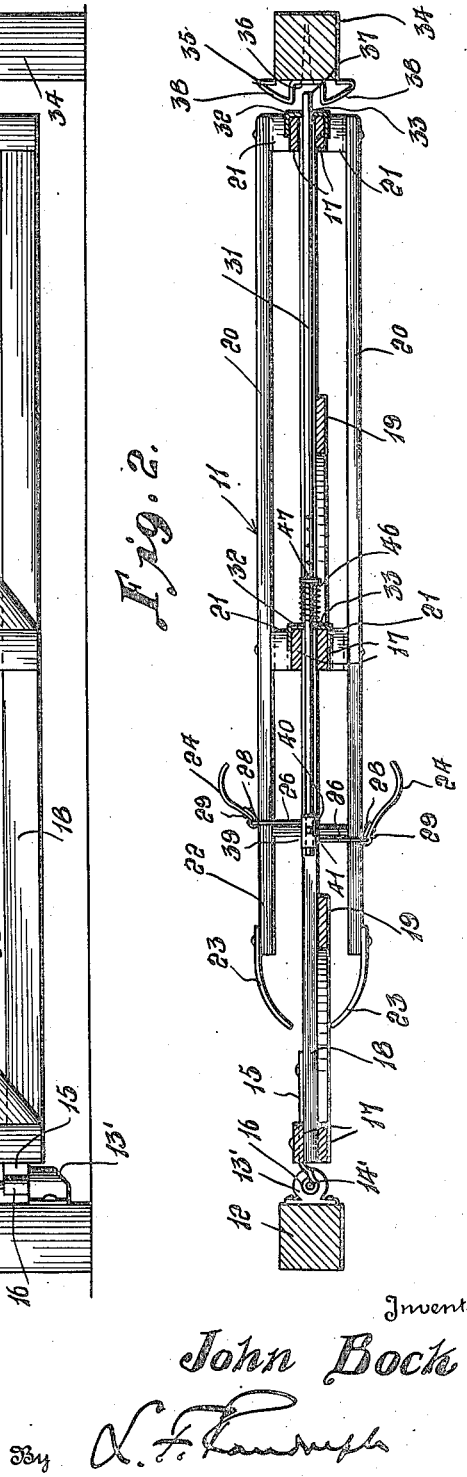
Inventor
John Bock

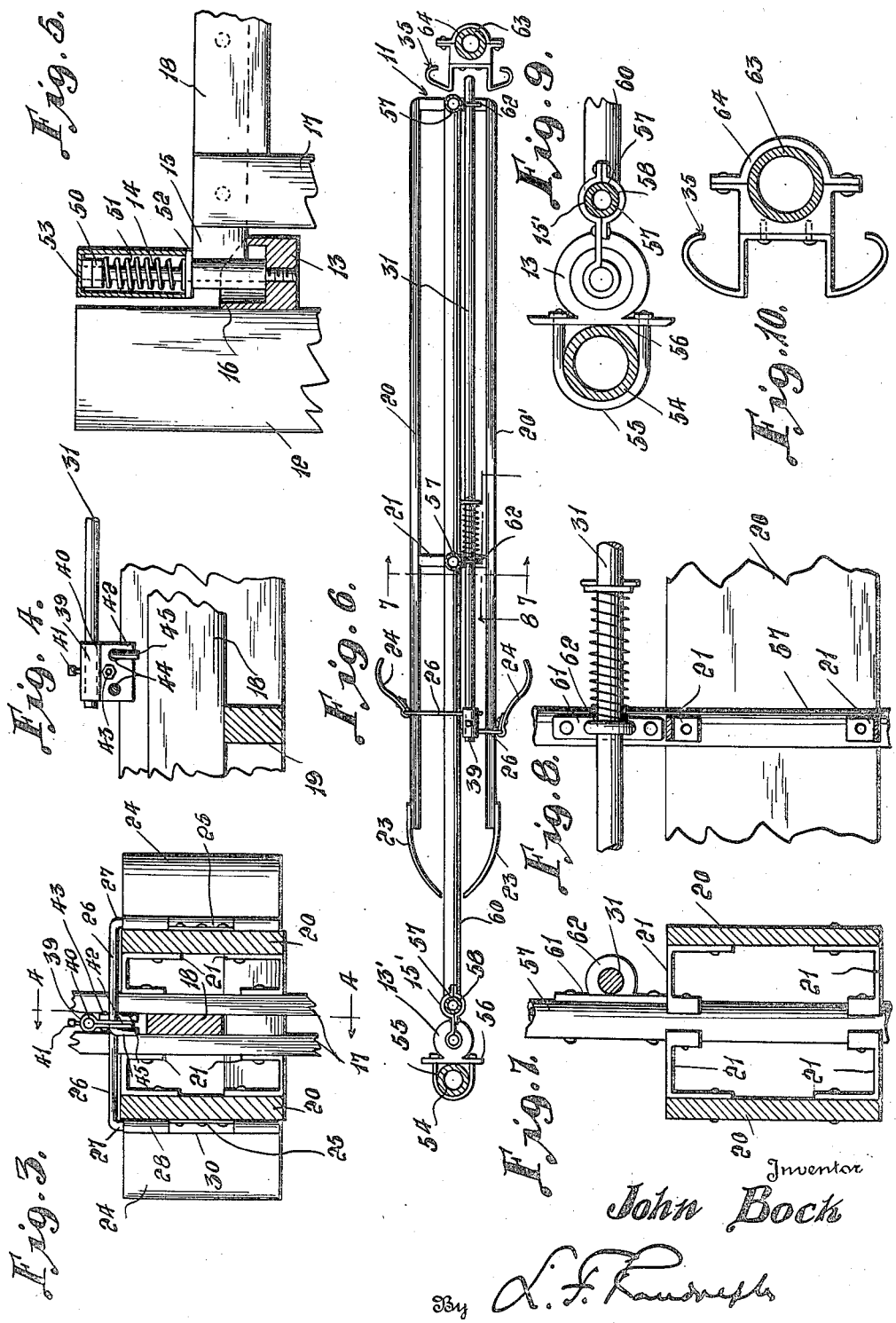

Patented May 24, 1938

2,118,722

UNITED STATES PATENT OFFICE 2,118,722

VEHICLE OPERATED GATE AND LATCH

John Bock, Salem, Mo.

Application March 25, 1937, Serial No. 133,063

4 Claims. (Cl. 39—28)

This invention relates to improvements in swinging gates.

The object of the invention is to provide a gate adapted to be used across a roadway that will be automatically opened by a vehicle striking the gate, and will return automatically to a closed and latched position after the vehicle has passed.

A further object of the invention resides in the provision of guard members to protect the gate structure from injury when being opened by a vehicle driving against it.

Another object of the invention is to provide means to be engaged by a vehicle to release the gate latch to allow the gate to swing open when pressed against.

Other objects and advantages of the invention will become apparent from the description and drawings, wherein:—

Figure 1 is a view in elevation of the gate in a closed position,

Figure 2 is a longitudinal sectional view on the line 2—2 of Figure 1,

Figure 3 is an enlarged fragmentary cross-sectional view on the line 3—3 of Figure 1, Figure 4 is an enlarged fragmentary sectional view on the line 4—4 of Figure 3, Figure 5 is a fragmentary elevational view partly in section on an enlarged scale showing in detail one of the hinge members, Figure 6 is a view similar to Figure 2 showing the invention as applied to a metal gate, Figure 7 is an enlarged fragmentary cross-sectional view on the line 7—7 of Figure 6, Figure 8 is an enlarged fragmentary sectional view on the line 8—8 of Figure 6, Figure 9 is an enlarged fragmentary plan view partly in section showing the modified means of mounting the hinge member, and Figure 10 is an enlarged plan view showing the modified means of mounting the keeper, the post being shown in section.

Referring more particularly to the drawings wherein like reference characters designate like or corresponding parts in the different views, a gate 11 is adapted to be mounted upon a gate post 12 by means of brackets 13 and 13' secured to the post 12 and which have studs 14 and 14' projecting upwardly from the brackets 13 and 13' to receive the looped ends 16 of hinge straps 15.

The gate 11 comprises the three sets of vertical members 17, the four horizontal members 18 fastened between members 17, and the diagonal braces 19.

Horizontal guard members 20 are mounted on each side of gate 11 by means of brackets 21 which are secured to the opposite sides of two of the sets of vertical members 17. The free ends 22 of members 20 have resilient plates 23 which curve inwardly and bear against gate 11, permitting the end 22 of guard member 20 to give; the plates 23 acting as shock absorbers.

Buffing plates 24 are pivotally secured to the guard members 20 by brackets 25 which engage the downturned ends 27 of cranks 26 as best seen in Figure 3. The portions 28 of plates 24 are looped about ends 27 and secured by a fastening 29. Between the loop portions 28 is a cut out portion 30 to permit brackets 25 to engage over ends 27. The loops 28 are secured fast to ends 27 while the ends 27 are adapted to revolve in brackets 25 so that when buffer plates 24 are pressed inwardly the cranks 26 will swing rearwardly or toward post 12.

A sliding bolt or latch 31 is mounted on gate 11 by means of U-shaped brackets 32 secured to the members 17. The bolt is adapted to slide horizontally in openings 33 of the U-shaped brackets 32.

A gate post 34 is adapted to support a keeper 35 having a recess portion 36 to receive the end 37 of bolt 31. The keeper 35 is provided with cam surfaces 38 to depress bolt 31 when the gate is being closed so that end 37 can engage recess 36.

A sleeve member 39 is adjustably secured to end 40 of bolt 31 by adjustment screw 41 as seen in Figures 3 and 4. The ends 42 of sleeve 39 extend downwardly and are secured together by a nut and bolt 43. The portions 42 are provided with openings 44, as seen in Figure 4, to receive the cranks 26 which are adapted to be engaged by openings 44. The free ends 45 of cranks 26 are bent downwardly to prevent disengagement from the opening 44.

The bolt 31 has a coil spring 46 mounted thereon which is secured between one of the brackets 32 and a pin 47 which is mounted in an opening 48 in bolt 31. The spring 46 normally urges the end 37 into engagement with recess 36.

The bracket 13 is provided with cam surfaces 49 which extend upwardly on each side from a point opposite to where bracket 13 is secured to post 12. Strap 15 is adapted to ride up onto these cam surfaces 49 when the gate is swung to an open position on either side.

The stud 14 is provided with a nut 50 threaded to its upper end, as seen in Figure 5, to hold a coil spring 51 which is mounted on stud 14. The lower end of spring 51 bears against a washer 52 which in turn bears against the upper face of loop 16. The spring 51 is enclosed in a casing 53.

In operation, assuming the gate to be closed, as in Figure 1, an automobile approaching the gate will strike one of the buffer plates 24 causing end 22 of guard member 20 to give against the action of plate 23, and at the same time buffer 24 will swing inwardly causing crank 26 to swing rearwardly carrying sleeve 39 and bolt 31 rearward with it, and compressing spring 46. This will release end 37 from the keeper 35 so that the gate 11 can be pushed open by the automobile. When the vehicle has passed the coil spring 51 bearing down on loops 16 will cause strap 15 to slide down the cam surface 49 swinging the gate to a closed position. In the meantime spring 46 will expand so that end 37 will engage cam surface 38 causing bolt 31 to retract against spring 46 until end 37 reaches the recess 36 when the bolt 31 will be pressed out by spring 46 so that end 37 will be held in engagement with recess 36. It is to be understood that the action will be the same when gate 11 swings open in the opposite direction. If it is desired to have gate remain in an open position, it may be accomplished by pushing the gate to the full open position, so that strap 15 will pass beyond the cam surface 49 and on to the upper horizontal side of bracket 13 so that the spring 51 will not cause the gate to return to its closed position.

Figures 6, 7, 8, 9, and 10 show the invention as applied to a metal gate. The post 54 has a U-shaped bolt 55 secured to it which supports a plate 56 which carries brackets 13 and 13'. The strap hinge 15' is bent and fastened to the vertical post 57 by member 58 which is bolted to strap 15' to clamp it on post 57 as best seen in Figure 9. The gate 11 comprises the three vertical members 57 and the two horizontal members 60. The guard members 20 are secured to the members 57 by the brackets 21. The bolt 31 is mounted on one side of member 57 by brackets 61 which are provided with a loop portion 62 to receive bolt 31 as best seen in Figure 7. The post 63 has a bracket 64 secured thereto which carries keeper 35. The rest of the parts can be used interchangeably and will not be described again. The operation of the gate is of course the same.

It is to be understood that only the preferred embodiment of the invention has been shown the right being reserved to make such changes and modifications as will not depart from the spirit of the invention.

I claim as my invention:—

1. An automatic gate, comprising a swinging gate carrying a sliding bolt, a keeper adapted to be engaged by said bolt, resilient guard members mounted on either side of said gate, buffing plates pivoted to said guard members and carrying cranks, said bolt adapted to be operated by said cranks, and said gate adapted to be opened when one of said buffing plates is pressed inwardly causing the crank to operate said bolt to release it from the keeper and permit the gate to swing open, said guard members cushioning the pivoted end of said gate from the impact of the vehicle.

2. A vehicle operated gate comprising a spring actuated sliding latch, a keeper to engage said latch, guard members resiliently mounted on each side of said gate, buffer plates pivotally secured to said guard members and operably connected to said sliding latch, said buffer plates projecting outwardly from said guard members to be engaged by a vehicle bumper to release said latch, said guard members arranged to cushion the further impact of said vehicle whereby the gate is swung to an open position, and means associated with said gate to cause it to automatically return to a closed position.

3. A vehicle operated gate comprising a sliding latch arranged to engage a stationary keeper, guard members mounted on each side of said gate, buffer plates pivotally mounted on said guard members and extending outwardly therefrom to receive the impact of a vehicle bumper, said buffer plates being connected to said latch to release it from said keeper, and said guard members being resiliently mounted adjacent the pivoted end of said gate to cushion said gate and buffer plates.

4. A vehicle operated gate comprising a spring pressed sliding latch, gate guards mounted on each side of said gate and resiliently supported adjacent the pivoted end of said gate, buffer plates pivotally connected to the resilient portion of said guard members, and extending outwardly therefrom, said buffer plates being operably connected to said sliding latch to release said gate when struck by a vehicle bumper, and the resilient ends of said guard members protecting the pivoted end of the gate from the force of the impact while said gate is swinging to an open position.

JOHN BOCK.